(12) United States Patent
Shin et al.

(10) Patent No.: US 11,079,404 B2
(45) Date of Patent: Aug. 3, 2021

(54) TEST FIXTURE FOR ANGLE OF ATTACK (AOA) SENSOR VANE

(71) Applicant: The Boeing Company, Chicago, IL (US)

(72) Inventors: Charley Shin, Seattle, WA (US); Bally Bang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 270 days.

(21) Appl. No.: 16/421,073

(22) Filed: May 23, 2019

(65) Prior Publication Data
US 2020/0371132 A1 Nov. 26, 2020

(51) Int. Cl.
| | | |
|---|---|---|
| G01P 21/02 | (2006.01) | |
| B64D 47/00 | (2006.01) | |
| B64F 5/60 | (2017.01) | |
| G01P 13/02 | (2006.01) | |

(52) U.S. Cl.
CPC ............ *G01P 21/025* (2013.01); *B64D 47/00* (2013.01); *B64F 5/60* (2017.01); *G01P 13/025* (2013.01)

(58) Field of Classification Search
CPC ...... G01P 21/025; G01P 13/025; G01P 1/026; B64D 47/00; B64F 5/60
See application file for complete search history.

(56) References Cited

U.S. PATENT DOCUMENTS

| | | | | |
|---|---|---|---|---|
| 2010/0064766 A1* | 3/2010 | Nugent | ................. | G01P 21/025 73/1.16 |
| 2016/0153805 A1* | 6/2016 | Argentieri | ............ | G01C 23/005 73/170.06 |

OTHER PUBLICATIONS

Norman M. McFadden, George R. Holden, Jack W. Ratcliff, "Instrumentation and calibration technique for flight calibration of angle-of-attack systems on aircraft", Dec. 5, 1952, NACA Research memorandum (Year: 1952).*
The Boeing Company, Test Fixture is used to accurately measure AOA Sensor deflection and for periodic alignment, Air Spares Inc., published prior to May 18, 2016, pp. 1-3, http://www.airspares.com/boeing-licensed-tooling/j34002-19/.
Cessna A Textron Company, Navigation—Stall Warning System Calibration, Adjustment, and In-Flight Test Jrocedure, Alert Service Letter, pp. 1-36, Cessna Aircraft Company, Wichita, KS, US.

* cited by examiner

*Primary Examiner* — Herbert K Roberts
*Assistant Examiner* — John M Royston
(74) *Attorney, Agent, or Firm* — Miller, Matthias & Hull LLP (57) ABSTRACT

A test fixture for determining calibration accuracy of an aircraft angle of attack sensor vane includes an outer disc, configured to be transiently fixed to an aircraft exterior portion surrounding the sensor vane, and an inner disc that includes a spring-loaded plunger configured to physically engage the sensor vane during tests. The inner disc is rotatable relative to the outer disc to accommodate rotation of the sensor vane when engaged with the inner disc. The outer disc includes a ring gear fixed thereto; the inner disc includes a manually operated knob containing a spur gear that reacts with the ring gear to rotate the inner disc when the knob is rotated. The outer disc is a clamshell structure formed of an upper annular disc and a lower annular disc rigidly secured together, and the inner disc is rotatably retained between the upper and lower annular discs.

20 Claims, 10 Drawing Sheets

TEST FIXTURE FOR ANGLE OF ATTACK (AOA) SENSOR VANE

FIELD

The present disclosure relates generally to testing and maintenance of angle of attack (AOA) sensor vanes on aircraft, and more specifically to test devices for determining accuracy of AOA sensor vane calibrations.

BACKGROUND

AOA sensor vanes are commonly employed on exterior surfaces of commercial aircraft for providing flight performance information. Physical movements of AOA sensor vanes are periodically tested against corresponding cockpit displays to assure accuracy of calibrations.

Existing calibration test devices are constructed of relatively heavy metal parts that can be difficult to manipulate and can be prone to loss of calibration. For example, in one available calibration test device, an index plunger unit for engaging the sensor vane is supported by a set of metal rods that are supported by a set of springs. After several engagements the rods may tend to become "loose" or unstable, rendering the unit less reliable for testing calibration accuracy.

Thus, a test device that maintains its calibration for consistently repeatable testing is desired. Also desirable is a lighter weight test device.

SUMMARY

In accordance with one aspect of the present disclosure, a test fixture is configured to determine calibration accuracy of a sensor vane that measures an angle of attack of an aircraft. The test fixture includes an outer disc configured to be transiently secured to an exterior portion of the aircraft that surrounds the sensor vane. The outer disc includes a ring gear, and an inner disc is movably secured to the outer disc. The inner disc is configured to engage the sensor vane. Rotary manipulation of the inner disc causes rotation of the sensor vane when the inner disc is engaged with the sensor vane. The inner disc includes an adjustment feature including a spur gear that reacts with the ring gear for rotation of the inner disc.

In accordance with another aspect of the present disclosure, a method of testing accuracy of a sensor vane for measuring an angle of attack of an aircraft by using a test fixture to determine calibration of the sensor vane is disclosed. The method includes transiently securing an outer disc of the test fixture to an exterior portion of the aircraft such that the outer disc overlies the sensor vane, and then manipulating an adjustment feature fixed to an inner disc of the test fixture to cause a spur gear of the adjustment feature to react with a ring gear fixed to the outer disc, thereby rotating the sensor vane via the inner disc of the test fixture when the latter is engaged with the sensor vane. The method further includes the inner disc being rotatably secured to the outer disc.

In accordance with yet another aspect of the present disclosure, a method of using a test fixture having a manual adjustment knob secured to an inner disc, and an actuator lever fixed to a plunger and secured to the inner disc, to determine calibration accuracy of a sensor vane capable of measuring an angle of attack of an aircraft, is disclosed. The method includes securing the test fixture over an exterior portion of the aircraft that includes the sensor vane projecting from the exterior portion; moving the actuator lever to engage the plunger with the sensor vane; and manipulating the manual adjustment knob to cause the sensor vane to rotate.

The features, functions, and advantages disclosed herein can be achieved independently in various embodiments or may be combined in yet other embodiments, the details of which may be better appreciated with reference to the following description and drawings.

The referenced drawings are not necessarily to scale, and that any disclosed embodiments are illustrated only schematically. Aspects of disclosed embodiments may be combined with or substituted by one another, and within various systems and environments that are neither shown nor described herein. As such, the following detailed description is merely exemplary, and not intended to be limiting in either application or use.

DETAILED DESCRIPTION

The following detailed description includes apparatus and methods for carrying out the present disclosure. Actual scope of the disclosure is as defined in the appended claims.

As those skilled in the art may appreciate, an angle of attack sensor vane is a flight instrument typically rotatably attached to and protruding from at least one side of an aircraft nose. It moves, similarly to a weather vane under forces of a wind flow, to provide a pilot with flight performance information, such as whether the aircraft may be approaching a wing stall. The angle of attack of an aircraft is monitored during flight; it may be generally defined as the angle between a chord line of a wing (of a fixed-wing aircraft) and a vector representing actual path of the aircraft through the atmosphere.

Figure 1:
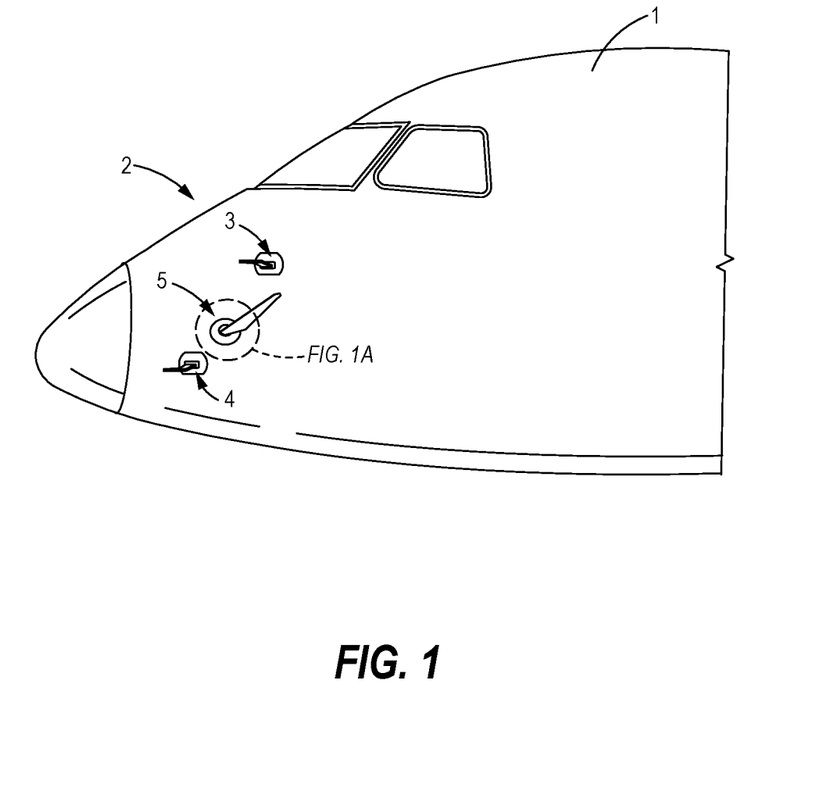
FIG. 1 is a perspective of a nose portion of a commercial aircraft, including an AOA sensor vane projecting from an exterior portion thereof, amenable for application of the disclosed test fixture to determine calibration accuracy in accordance with the present disclosure.

Referring to FIG. 1, an aircraft 1 (only the nose of the aircraft is shown in FIG. 1) includes an exterior portion 2 from which extends in upper pitot tube 3 and a lower pitot tube 4, the latter facilitating cockpit displays of airspeed of the aircraft. Also extending from the exterior portion 2 is a sensor vane 5, which extends from and rotates on the exterior portion 2 for measuring angle of attack.

Figure 1A:
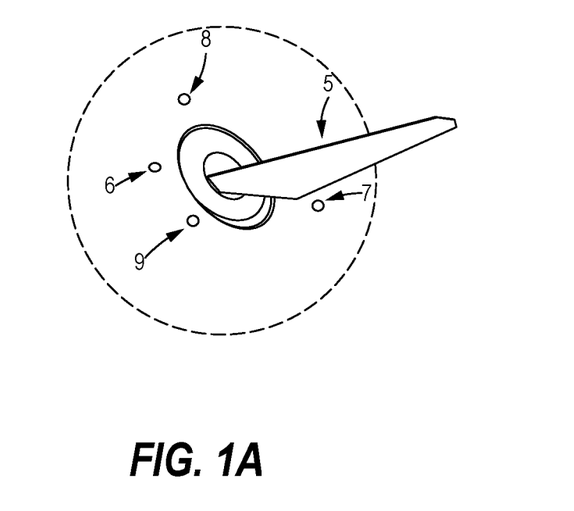
FIG. 1A is an enlarged perspective schematic of the AOA sensor vane of FIG. 1, displaying test fixture attachment apertures in the exterior portion for accommodation of the disclosed test fixture in accordance with the present disclosure.

FIG. 1A is an enlarged view of a portion of FIG. 1, displaying the sensor vane 5, as well as a first test fixture locating hole 6, a second test fixture locating hole 7, a first mounting screw aperture 8, and a second mounting screw aperture 9, for purposes described below.

Figure 2:
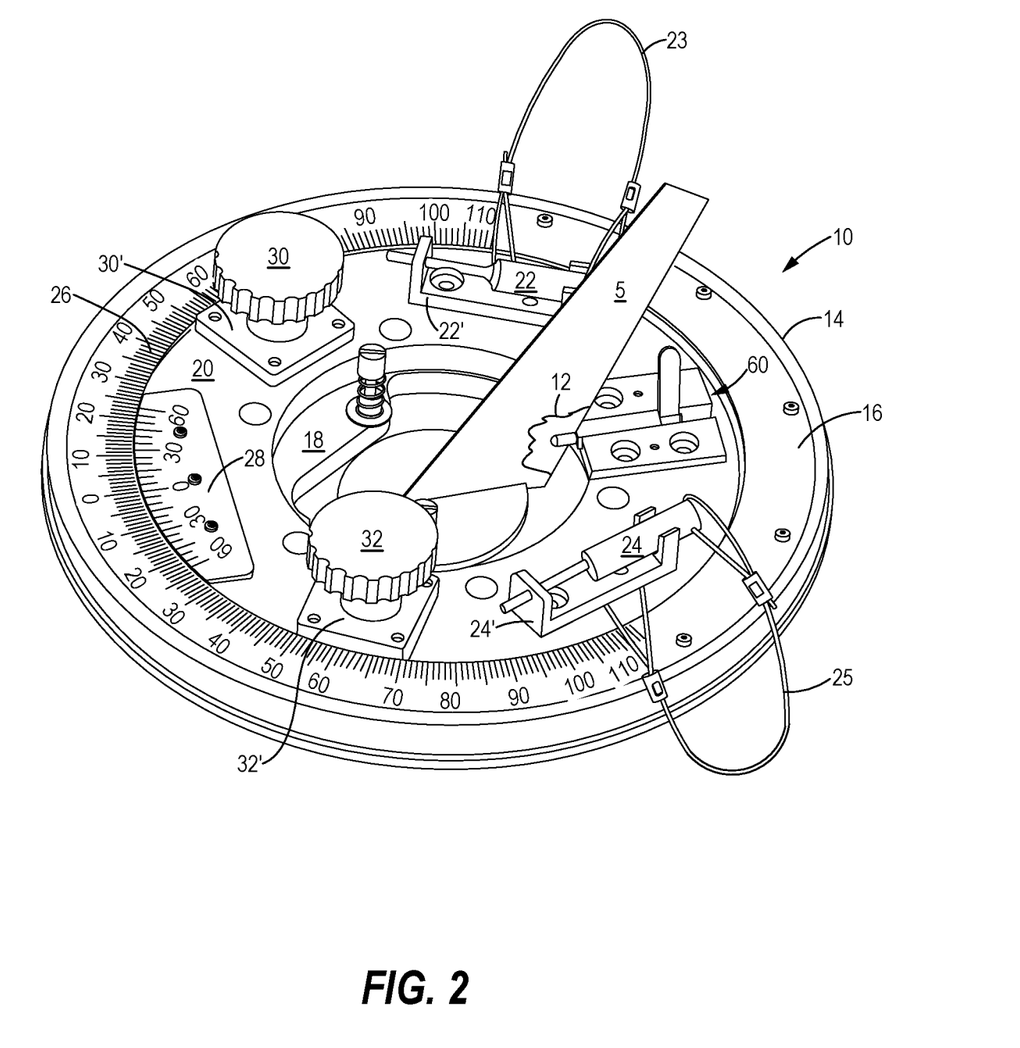
FIG. 2 is a perspective view of one example of the disclosed test fixture, shown installed over an AOA sensor vane in accordance with the present disclosure.

Referring now to FIG. 2, an angle of attack (AOA) test fixture 10 is installed over the sensor vane 5, the sensor vane shown protruding through the outer clamshell disc 14. The outer clamshell disc 14 is formed of an upper annular disc 16 and a lower annular disc 18. A breakaway portion 12 is schematically shown in the view of the sensor vane 5 in FIG. 2 for purposes of revealing a part (described below) that is configured to engage the sensor vane 5 for test purposes. An inner disc 20 is rotatably retained between the upper annular disc 16 and the lower annular disc 18. It should also be noted that the inner disc 20 is also an annular disc for accommodating protrusion of the sensor vane 5 therethrough, as shown.

For purposes of transiently securing the AOA test fixture 10 to the exterior portion 2 for conducting tests to determine calibration accuracy of the sensor vane 5, an upper locator pin 22 and a lower locator pin 24 are initially removed from respective storage brackets and applied to the first and second test fixture locating holes 6 and 7 (FIG. 1A). For this purpose, the upper locator pin 22 is retained in a storage bracket 22' and the lower locator pin 24 is retained in a storage bracket 24'. The storage brackets 22' and 24' are fixedly mounted to the inner disc 20, and the upper and lower locator pins 22, 24 are removably connected to their respective storage brackets by a first lanyard 23 and a second lanyard 25.

Figure 4:
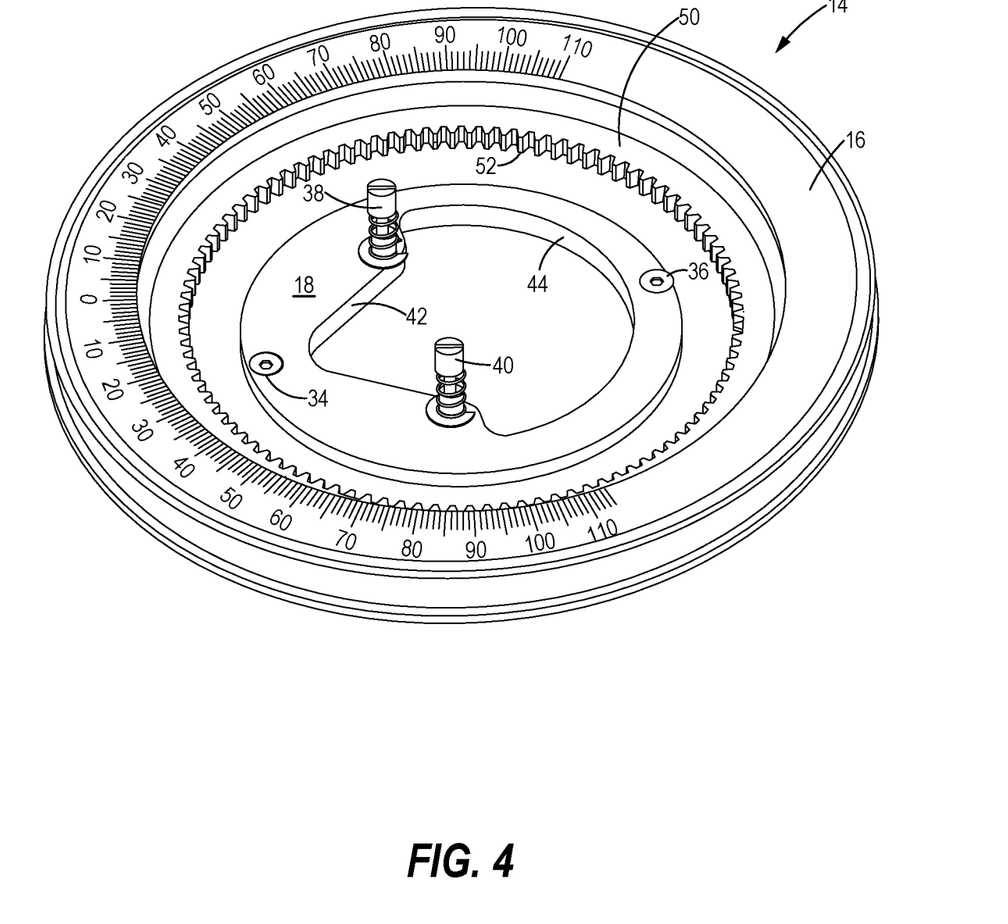
FIG. 4 is a perspective view of the test fixture of FIGS. 2 and 3, but with portions removed to show various details.

Referring now also to FIG. 4, for initial placement of the test fixture 10, the upper and lower locator pins 22, 24 are manually pressed through a first locator hole 34 and a second locator hole 36 in the lower annular disc 18 for subsequent passage and securement into the respective first and second test fixture locating holes 6 and 7 (FIG. 1A). Next, an upper spring-loaded mounting screw 38 and a lower spring-mounting screw 40, both permanently mounted to the lower annular disc 18, are threaded respectively into the first and second mounting screw apertures 8 and 9 (FIG. 1A). Thereafter, the initially placed locator pins 22, 24 are physically removed and reinstalled into their respective storage brackets 22' and 24', since at that point, the test fixture 10 is securely affixed to the exterior portion 2.

Referring back to FIG. 2, the upper annular disc 16 contains an outer reference scale 26, which becomes fixed when the test fixture 10 is secured in place on the exterior portion 2. In registered cooperation with the outer reference scale 26, an inner Vernier reference scale 28 is fixed on the inner disc and is thus rotatably movable relative to the outer reference scale 26, for testing calibration accuracy of the sensor vane 5, as further described below.

Figure 3:
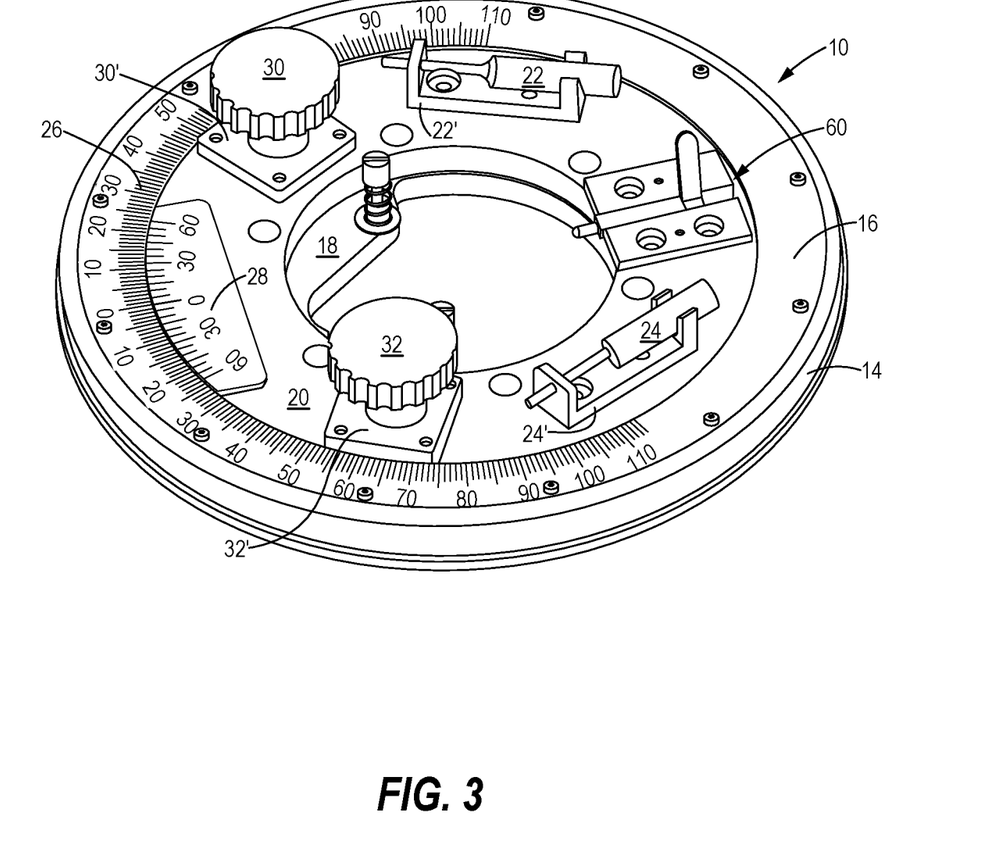
FIG. 3 is a perspective view of the same example of FIG. 2, albeit detached from the AOA sensor vane included in FIG. 2.

Referring now also to FIG. 3, the test fixture 10 is shown untethered from the exterior portion 2. FIG. 3 reveals an opening (e.g. a sensor vane opening 44 in the lower annular disc 18, shown in FIG. 4) as provided in each of the upper annular disc 16, the lower annular disc 18, and the inner disc 20, through which the sensor vane 5 may protrude during angle of attack calibration tests. The view of FIG. 3 also reveals a plunger assembly 60, described below, shown untethered from the sensor vane 5, unlike that displayed in FIG. 2.

Continuing reference to FIG. 3, an upper adjustment knob 30 and a lower adjustment knob 32 are each shown protruding from a base 30' and 32', respectively. The adjustment knobs 30, 32 may be knurled as shown for effective manipulation. Each base 30' and 32' is fixed to the inner disc 20, and the adjustment knobs provide a means for rotation of the inner disc 20 relative to, and within, the outer clamshell disc 14. Redundancy of the adjustment knobs 30, 32 is strictly for convenience, as actual use of either of the knobs will likely depend on which physical side of the aircraft 1 the sensor vane 5 is located.

Referring specifically to FIG. 4, for accommodating protrusion of the sensor vane 5 through the center of the test fixture 10, the lower annular disc 18 includes a leading edge relief 42 as part of the earlier referenced sensor vane opening 44. The leading edge relief 42 is necessitated in the disclosed example by physical placement of the above-referenced pair of spring-loaded mounting screws 38, 40 on the lower annular disc 18. A ring gear 50 is shown rigidly secured to the lower annular disc 18. The ring gear 50 may be either integrally formed with the lower annular disc 18, bonded thereto by an adhesive, or may alternatively be secured thereto by fasteners (not shown).

Figure 5:
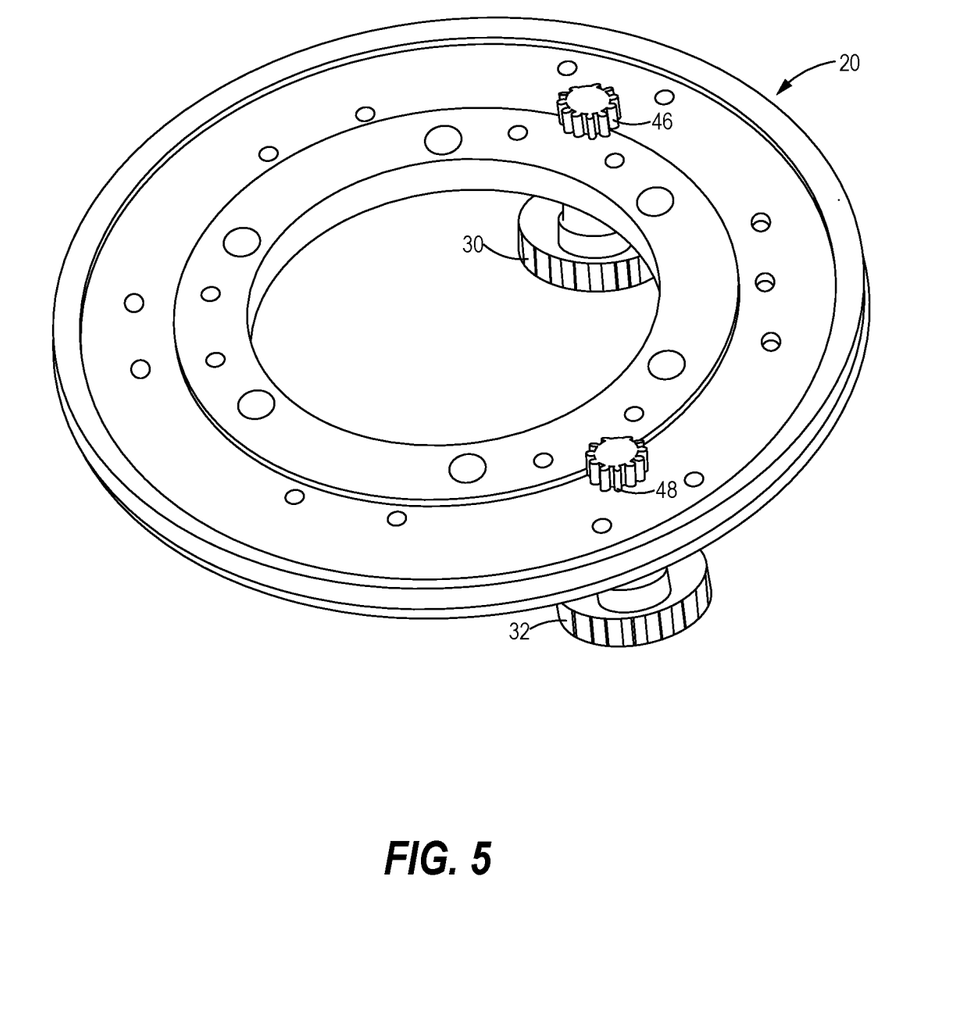
FIG. 5 is a perspective view of the portions removed in the test fixture view of FIG. 4.

Referring also to FIG. 5, the ring gear 50 includes ring gear teeth 52 configured for direct and continuous engagement with spur gears 46 and 48, each of which is fixed to one adjustment knob 30 and 32, respectively, for rotation thereby. Upon manual rotation of either adjustment knob, the associated spur gear 46, 48 is configured to operatively react against the ring gear teeth 52 to rotate the inner disc 20 within the outer clamshell disc 14.

Figure 6:
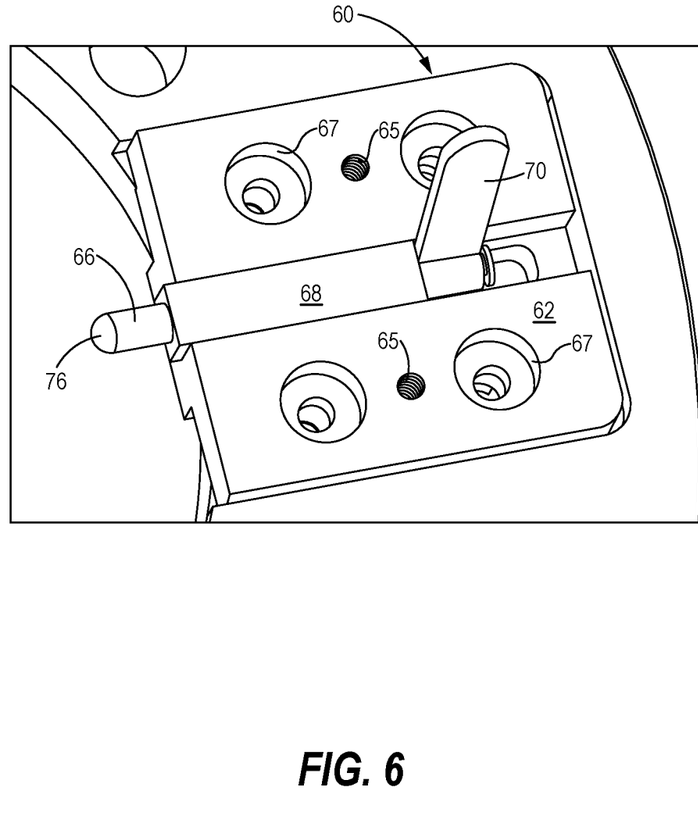
FIG. 6 is an enlarged view of a plunger assembly included in the test fixture, as displayed in FIGS. 2 and 3, but without an interlock plate.
Figure 7:
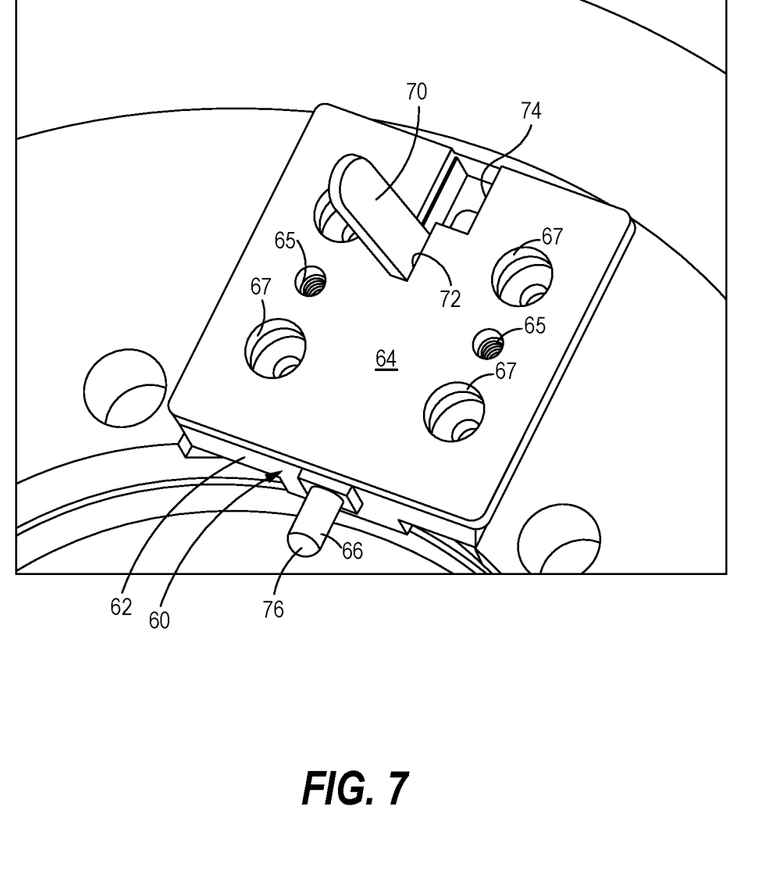
FIG. 7 is a similar enlarged view of the plunger assembly of FIG. 6, including the interlock plate absent from the view of FIG. 6.

As described, FIG. 6 is an enlarged view of a plunger assembly 60 included in the test fixture 10, as displayed in FIGS. 2 and 3, but without an interlock plate 64. FIG. 7 is a similar enlarged view of the plunger assembly 60 of FIG. 6, including the interlock plate 64 absent from the view of FIG. 6. Referring now to FIGS. 6 and 7, the plunger assembly 60 includes a plunger housing 62, which supports a plunger 66 within a plunger block 68. The plunger block 68 supports axial and rotary movement of the plunger 66 within the plunger block 68. Threaded apertures 65 accommodate the interlock plate 64 (FIG. 7), which is secured to the plunger housing 62 to enable control of an actuator lever 70 fixed to the plunger 66. Separately, bolt apertures 67 accommodate securement of the plunger assembly 60 to the inner disc 20 (FIGS. 2 and 3).

Figure 8:
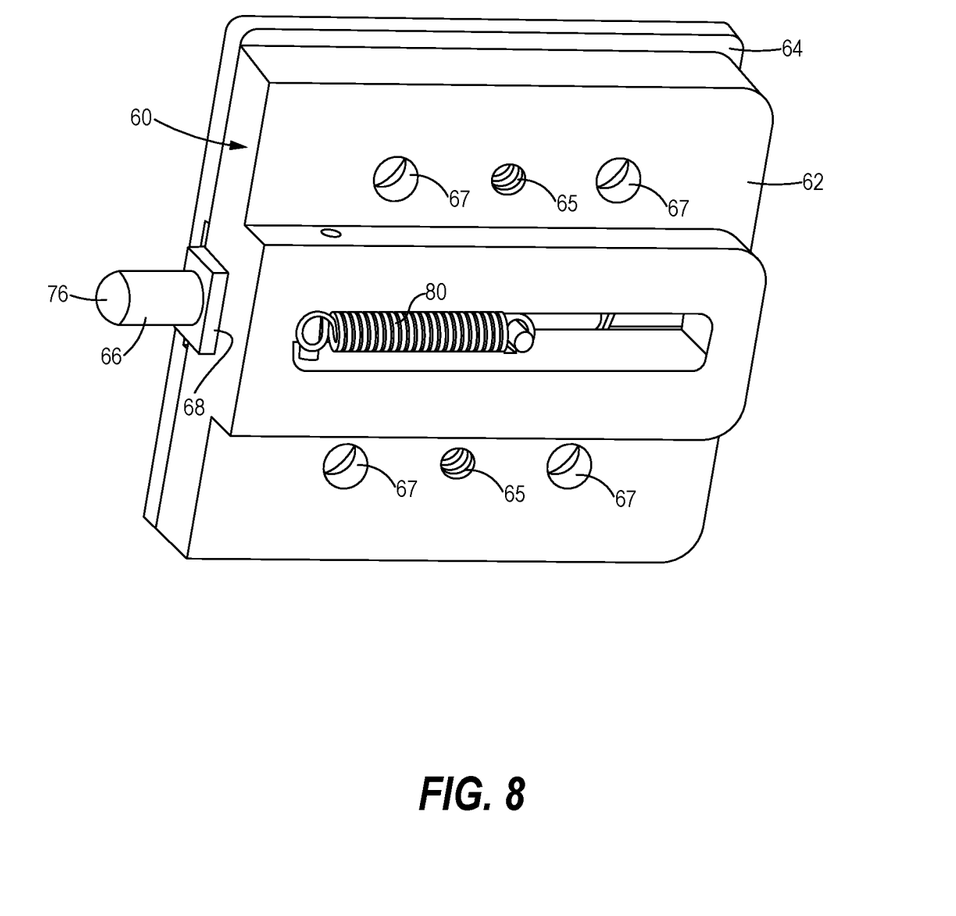
FIG. 8 is an enlarged bottom view of the plunger assembly shown in FIG. 7.

Referring now to FIGS. 7 and 8, the actuator lever 70 is effective to move the sensor vane engagement end 76 of the plunger 66 axially away from a concave engagement dimple (not shown) within the sensor vane 5 (FIG. 2). For this purpose, the actuator lever 70 has an engaged plunger position 72 (FIG. 7), as well as a disengaged plunger position 74 (FIG. 7), with the latter plunger position 74 providing a lockout capability against forces of a spring 80, as shown in a bottom view of the plunger assembly 60 (FIG.

8). It will be appreciated that the lockout (disengaged) plunger position 74 is enabled via combined axial translation and rotary movement of both the plunger 66 and the actuator lever 70 attached thereto. As noted, the latter movements are supported via the plunger block 68, which supports the plunger 66, and via the interlock plate 64 supports movement and positioning of the actuator lever 70 between the respective engaged and disengaged positions 72, 74.

The test fixture 10 as disclosed and described above may be employed to test accuracy of a sensor vane 5 for measuring an angle of attack of an aircraft 1. Such a test may involve a method of using the test fixture 10 to determine calibration accuracy of the sensor vane 5 by transiently securing the outer disc 14 of the test fixture 10 to an exterior portion 2 of the aircraft 1 such that the outer disc 14 overlies the sensor vane 5, the outer disc 14 including a ring gear 50; then coupling an inner disc 20 of the test fixture 10 to the sensor vane 5, with the inner disc 20 being rotatably secured to the outer disc 14. The method may further include manipulating an adjustment feature 30, 32 of the test fixture 10, with the adjustment feature 30, 32 fixed to the inner disc 20, causing a spur gear 46, 48 of the test fixture 10 that engages the ring gear 50 to react with the ring gear 50, to thereby rotate the sensor vane 5.

The method may further include the outer disc 14 having a lower annular disc 18 and an upper annular disc 16, with the inner disc 20 being rotatably retained between the lower annular disc 18 and the upper annular disc 16, and the lower annular disc 18 of the outer disc 14 configured to be directly secured to the exterior portion 2.

The method may further include the lower annular disc 18 containing a spring-loaded mounting screw 38, 40 for transient securement of the test fixture 10 to the exterior portion 2, and the adjustment feature 30, 32 being defined by an adjustment knob 30, 32 fixedly attached to the spur gear 46, 48 for rotation therewith, and the adjustment knob 30, 32 having a base 30', 32' fixedly secured to the inner disc 20.

The method may further include providing a plunger assembly 60 having a plunger 66, an actuator lever 70 rigidly affixed to the plunger 66, and a spring 80 disposed against the plunger 66; securing the plunger assembly 60 to the inner disc 20; and configuring the actuator lever 70 and the spring 80 to control engagement and disengagement of the plunger 66 with the sensor vane 5.

Finally, the method may include forming the plunger assembly 60 to include a plunger block 68 for supporting the plunger 66, and to enable axial and rotary manipulation of the actuator lever 70 and the plunger 66 within the plunger block 68.

Figure 9:
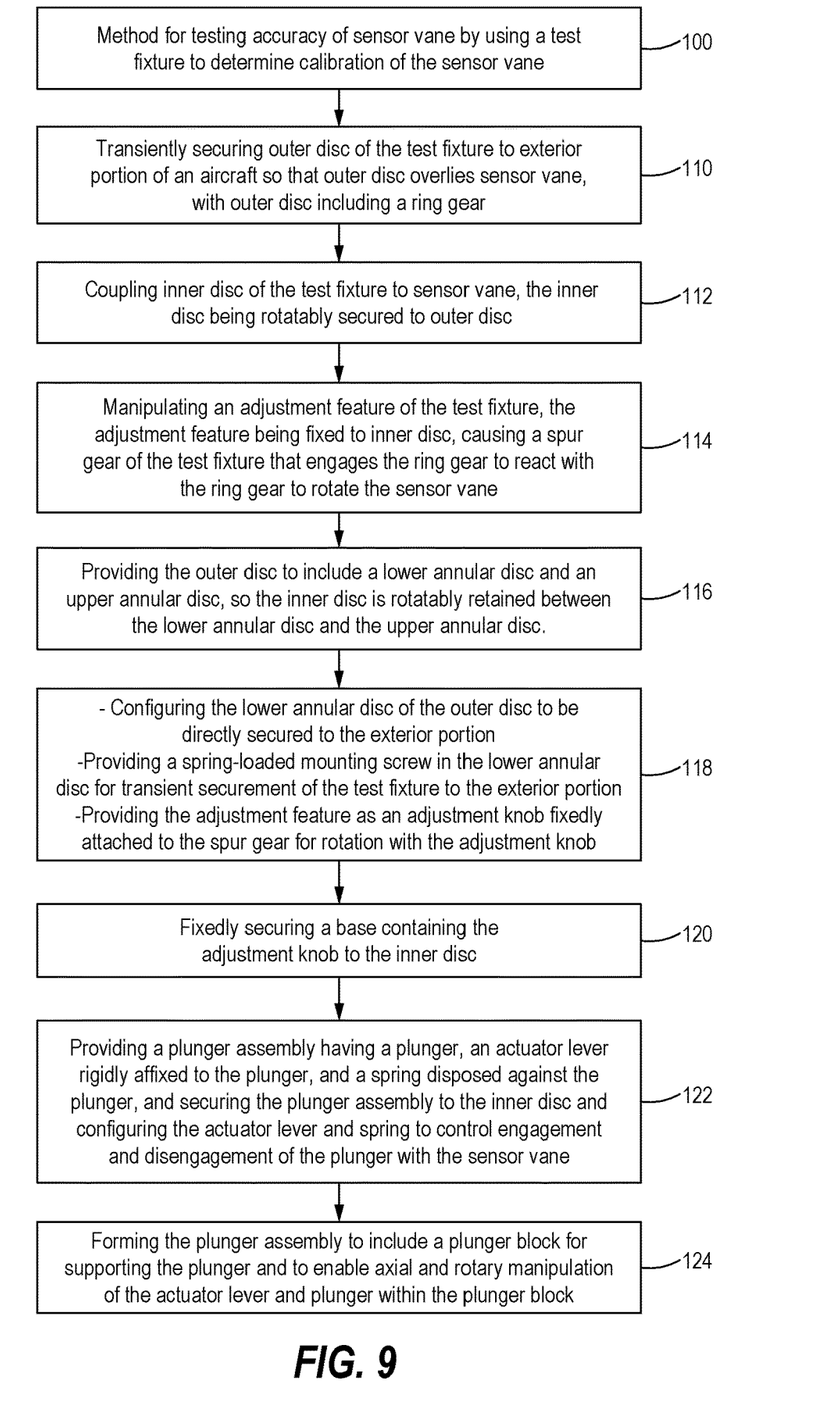
FIG. 9 is a flow chart illustrating a method of testing accuracy of a sensor vane for measuring an angle of attack of an aircraft by using a test fixture to determine calibration of the sensor vane in accordance with the present disclosure.

FIG. 9 is a flowchart of a method 100 for testing accuracy of the disclosed sensor vane 5 using the disclosed test fixture 10. Steps 110 through 124 of the method 100 incorporate the method steps as described above for determining calibration accuracy of the sensor vane 5 via test fixture 10.

Another method of using the test fixture 10 includes having a manual adjustment knob 30, 32 secured to an inner disc 20, and an actuator lever 70 fixed to a plunger 66 secured to the inner disc 20, to determine calibration accuracy of a sensor vane 5 capable of measuring an angle of attack of an aircraft 1. The method may include securing the test fixture 10 over an exterior portion 2 of the aircraft 1 that includes the sensor vane 5 projecting from the exterior portion 2; then moving the actuator lever 70 to engage the plunger 66 with the sensor vane 5; followed by manipulating the manual adjustment knob 30, 32 to cause the sensor vane 5 to rotate.

The method of using the test fixture 10 may further include using the manual adjustment knob 30, 32 to rotate the inner disc 20, to thereby rotate the sensor vane 5, wherein the actuator lever 70 is both axially and rotationally moveable on the test fixture 10.

Figure 10:
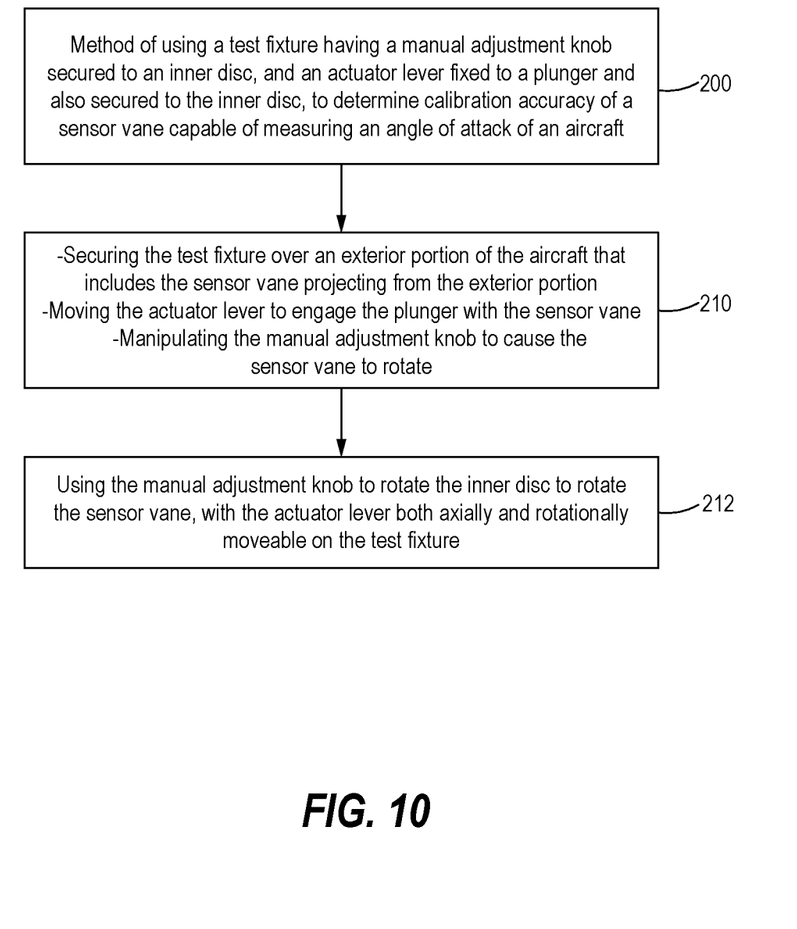
FIG. 10 is a flow chart illustrating a method of using a test fixture to determine calibration of a sensor vane capable of measuring an angle of attack of an aircraft, including manipulating an adjustment knob of the test fixture to cause the sensor vane to rotate in accordance with the present disclosure.

FIG. 10 is a flowchart of a method 200 of using the disclosed test fixture 10 to determine calibration accuracy of the disclosed sensor vane 5. Steps 210 and 212 of the method 200 incorporate the method steps just described, including manipulating the manual adjustment knob 30, 32 to cause rotation of the sensor valve 5.

Although specific examples and specific methods have been described herein, this disclosure may admit to yet other variations and modifications neither described nor suggested. For example, although not described above, the AOA test fixture 10 may be comprised of machined plastic parts, and/or 3D-printed parts, resulting in a structure significantly lighter, simpler, and lower in cost than known test devices. For example, if the outer clamshell disc 14 is formed of a machined plastic, such part is less likely to scratch and/or damage exterior skin surfaces of aircraft to which the test fixture 10 may be attached during tests. The angle scales on the disclosed unit can be fabricated using machined aluminum sheets anodized with color film, along with laser etched angle scale marks to provide for an accurate, light-weight, inexpensive device. The plunger assembly 60 may include some metal parts, including the plunger 66, the plunger block 68, and the actuator lever 70, for assuring greater durability.

Alternatively, there may be several other approaches for carrying out of this disclosure, as may be appreciated by those skilled in the art.

What is claimed is:

1. A test fixture configured to determine calibration accuracy of a sensor vane that measures an angle of attack of an aircraft , the test fixture comprising:
    an outer disc configured to be transiently secured to an exterior portion of the aircraft, the exterior portion including the sensor vane , the outer disc including a ring gear; and
    an inner disc configured to be coupled to the sensor vane, the inner disc being movably secured to the outer disc for rotary manipulation of the inner disc to rotate the sensor vane when coupled thereto; and
    wherein the inner disc includes an adjustment feature including a spur gear that reacts with the ring gear to rotate the inner disc.

2. The test fixture of claim 1, wherein the outer disc defines a clamshell structure comprising a lower annular disc and an upper annular disc, wherein the inner disc is rotatably retained between the lower annular disc and the upper annular disc.

3. The test fixture of claim 2, wherein the lower annular disc of the outer disc is configured to be directly secured to the exterior portion.

4. The test fixture of claim 2, wherein the lower annular disc contains a spring-loaded mounting screw for transient securement of the test fixture to the exterior portion.

5. The test fixture of claim 1, wherein the adjustment feature comprises an adjustment knob that includes the spur gear fixedly attached to the adjustment knob for rotation therewith.

6. The test fixture of claim 5, wherein the adjustment knob has a base fixedly secured to the inner disc.

7. The test fixture of claim 1, further comprising a plunger assembly having a housing secured to the inner disc, the plunger assembly including a plunger, an actuator lever rigidly affixed to the plunger, and a spring disposed against the plunger, wherein the actuator lever and the spring are configured to control engagement and disengagement of the plunger with the sensor vane.

8. The test fixture of claim 7, wherein the plunger assembly includes a plunger block for supporting the plunger and enabling axial and rotary manipulation of the actuator lever and the plunger within the plunger block.

9. The test fixture of claim 7, wherein the plunger assembly includes an interlock plate secured to the housing, wherein the interlock plate retains the actuator lever against force of the spring when the plunger is disengaged from the sensor vane.

10. The test fixture of claim 7, wherein the spring is configured by default to engage the plunger with the sensor vane.

11. A method of testing accuracy of a sensor vane for measuring an angle of attack of an aircraft by using a test fixture to determine calibration of the sensor vane, the method comprising:
 transiently securing an outer disc of the test fixture to an exterior portion of the aircraft such that the outer disc overlies the sensor vane, the outer disc including a ring gear;
 coupling an inner disc of the test fixture to the sensor vane, wherein the inner disc is rotatably secured to the outer disc; and
 manipulating an adjustment feature of the test fixture, wherein the adjustment feature is fixed to the inner disc, causing a spur gear of the test fixture that engages the ring gear to react with the ring gear, to thereby rotate the sensor vane.

12. The method of claim 11, wherein the outer disc includes a lower annular disc and an upper annular disc, and wherein the inner disc is rotatably retained between the lower annular disc and the upper annular disc.

13. The method of claim 12, wherein the lower annular disc of the outer disc is configured to be directly secured to the exterior portion.

14. The method of claim 12, wherein the lower annular disc contains a spring-loaded mounting screw for transient securement of the test fixture to the exterior portion.

15. The method of claim 11, wherein the adjustment feature further comprises an adjustment knob fixedly attached to the spur gear for rotation therewith.

16. The method of claim 15, wherein the adjustment knob has a base fixedly secured to the inner disc.

17. The method of claim 11, further comprising:
 providing a plunger assembly having a plunger, an actuator lever rigidly affixed to the plunger, and a spring disposed against the plunger;
 securing the plunger assembly to the inner disc; and
 configuring the actuator lever and the spring to control engagement and disengagement of the plunger with the sensor vane.

18. The method of claim 17, further comprising forming the plunger assembly to include a plunger block for supporting the plunger, and to enable axial and rotary manipulation of the actuator lever and the plunger within the plunger block.

19. A method of using a test fixture having a manual adjustment knob secured to an inner disc, and an actuator lever fixed to a plunger and also secured to the inner disc, to determine calibration accuracy of a sensor vane capable of measuring an angle of attack of an aircraft, the method comprising:
 securing the test fixture over an exterior portion of the aircraft that includes the sensor vane projecting from the exterior portion;
 moving the actuator lever to engage the plunger with the sensor vane; and
 manipulating the manual adjustment knob to cause the sensor vane to rotate.

20. The method of claim 19, further comprising using the manual adjustment knob to rotate the inner disc, thereby rotating the sensor vane, wherein the actuator lever is both axially and rotationally moveable on the test fixture.

\* \* \* \* \*